United States Patent [19]

Jüliger

[11] Patent Number: 5,229,602
[45] Date of Patent: Jul. 20, 1993

[54] CONTAMINATION SENSOR FOR TRANSPARENT ELEMENTS HAVING A REFLECTION LIGHT BARRIER AND A WORKING VOLTAGE CONTROLLER

[75] Inventor: Peter Jüliger, Hagenbach/Pfalz, Fed. Rep. of Germany

[73] Assignee: Robert Bosch GmbH, Stuttgart, Fed. Rep. of Germany

[21] Appl. No.: 778,869
[22] PCT Filed: Jun. 1, 1990
[86] PCT No.: PCT/DE90/00417
 § 371 Date: Dec. 23, 1991
 § 102(e) Date: Feb. 7, 1991

[30] Foreign Application Priority Data

Jul. 14, 1989 [DE] Fed. Rep. of Germany ....... 3923281

[51] Int. Cl.⁵ .............................. H01J 40/14
[52] U.S. Cl. .................. 250/222.2; 340/602
[58] Field of Search ............... 250/222.1, 222.2, 572, 250/573, 214 B, 214 AL; 356/239, 446, 445, 448; 340/602, 458, 583

[56] References Cited

U.S. PATENT DOCUMENTS 4,128,760 12/1978 Del Signore, II ............ 250/214 B
4,538,064 8/1985 Kovacs ......................... 250/573
4,816,667 3/1989 Meinert ........................ 250/222.1
4,851,689 7/1989 Hasegawa ..................... 250/214 B
4,987,296 1/1991 Kajioka et al. ................ 250/222.1

FOREIGN PATENT DOCUMENTS 3619208 12/1987 Fed. Rep. of Germany .

Primary Examiner—David C. Nelms
Assistant Examiner—Que T. Le
Attorney, Agent, or Firm—Michael J. Striker

[57] ABSTRACT

A circuit arrangement for detecting foreign bodies on a transparent element, particularly in a motor vehicle, including a dynamically driven reflection light barrier having a light emitting diode, a pulse generator connected electrically to the light emitting diode to produce light pulses and a phototransistor having a collector and an emitter. The phototransistor and the light emitting diode are positioned on the transparent element so the phototransistor receives reflected light produced by the LED. A resistor connects a power supply including a circuit, which can double an operating voltage in the motor vehicle, to the collector of the phototransistor. To neutralize the effects of stray light, e.g. from headlights of other vehicles, the circuit arrangement is provided with a working point controller connected electrically to the doubler circuit and to the collector of the photoresistor for controlling a voltage difference across the collector and emitter of the photoresistor as a function of an incident extraneous light intensity to compensate for the extraneous light intensity and to obtain an AC output voltage portion from the phototransistor substantially dependent only on the light reflected from the foreign bodies.

16 Claims, 2 Drawing Sheets

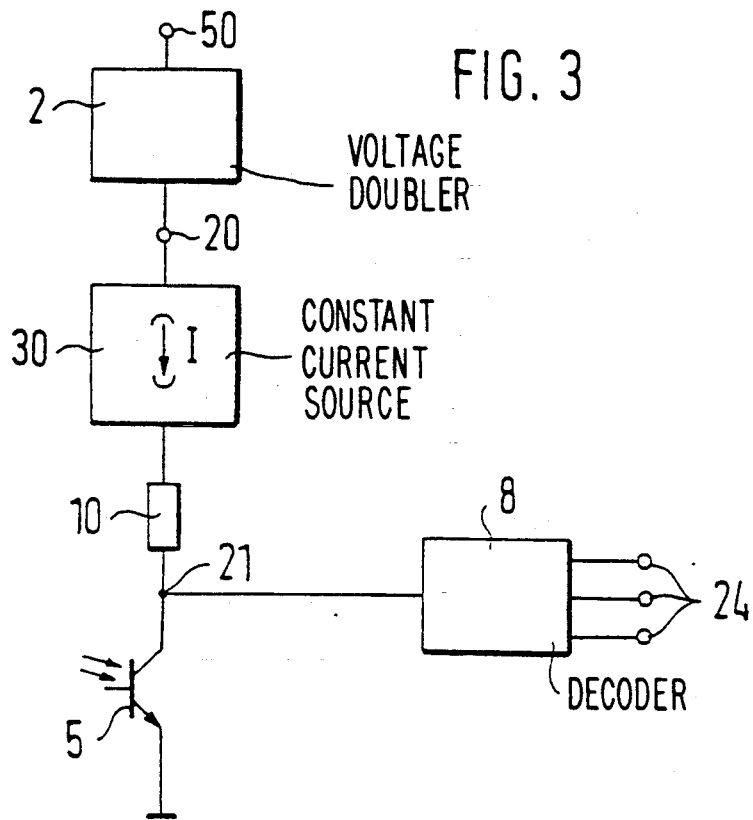
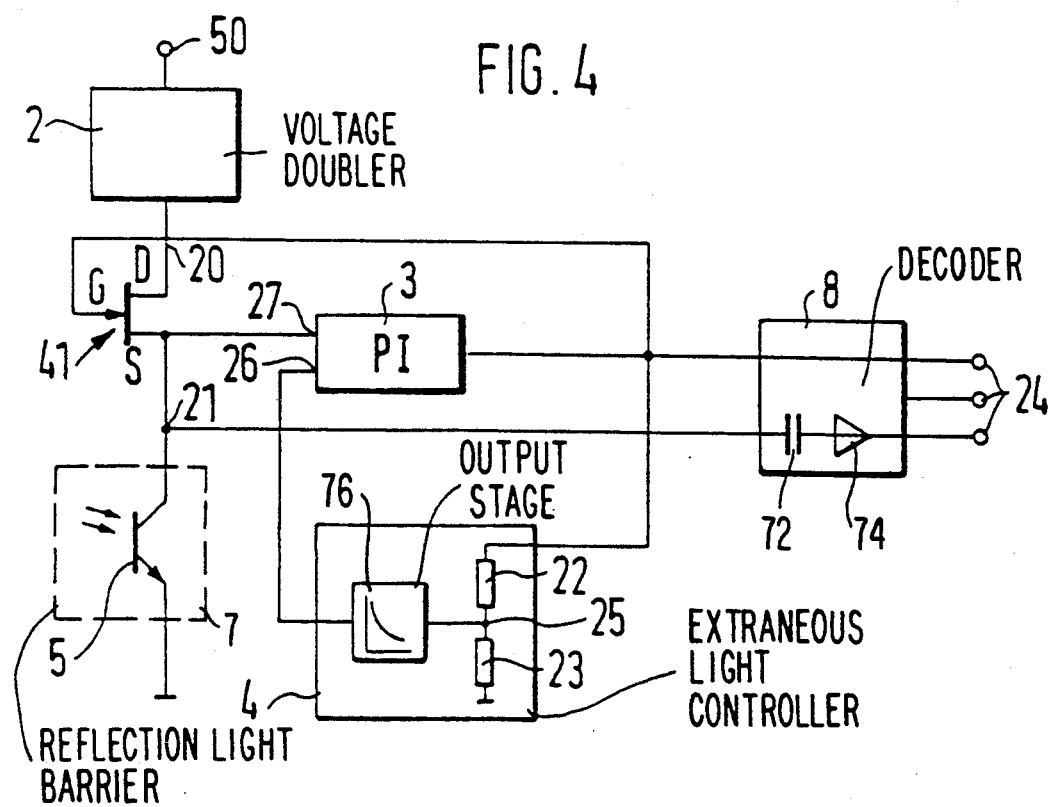

CONTAMINATION SENSOR FOR TRANSPARENT ELEMENTS HAVING A REFLECTION LIGHT BARRIER AND A WORKING VOLTAGE CONTROLLER

BACKGROUND OF THE INVENTION

The invention is based on a circuit arrangement for an optoelectronic contamination sensor for detecting foreign bodies on a transparent element More particularly, it relates to a circuit arrangement for an optoelectronic contamination sensor for detecting foreign bodies on a transparent element, which has a dynamically driven reflection light barrier whose receiver is fed by a supply voltage via a working resistor. It is known that dust, dirt, rain or snow adversely affect the light transmission on windscreens or headlamp lenses of a motor vehicle. In order to eliminate the contamination, the window or lens is to be automatically cleaned. The cleaning of the window or lens is triggered by an optoelectronic contamination sensor which is insensitive to extraneous light which originates from light in the surroundings or the oncoming light of other headlamps or the vehicle's own headlamps.

German Offenlegungsschrift 36 19 208 discloses a device which detects a wet or dry contamination on the surface of a headlamp lens and, in the event of contamination, activates a cleaning system. In this device, an optical transmitter and receiver are arranged on the inside of the lens. The radiation emitted by the optical transmitter is reflected by contamination particles on the lens. The reflected radiation is largely picked up by the receiver and fed to an evaluation circuit.

It was shown in practice that the sensor signal was temporarily disturbed in particular by the reflection of the vehicle's own headlamp light such that, despite increasing contamination of the lens, the sensor signal no longer reached the trigger threshold for the switching on of the cleaning system. The circuit arrangement of the contamination sensor was then incapable of functioning.

The same problem occurred when there was a very large light incidence from oncoming vehicles, which is very troublesome in particular during night driving.

SUMMARY OF THE INVENTION

According to the invention, the circuit arrangement for detecting foreign bodies on a transparent element comprises a dynamically driven reflection light barrier having a receiver for light reflected from foreign bodies on a transparent element, advantageously a phototransistor; a resistor connected electrically with the receiver through which a voltage is supplied to the receiver; and a working point controller means connected electrically to the receiver for controlling a voltage difference across the receiver as a function of an incident extraneous light intensity to compensate for the extraneous light intensity and to obtain a dynamic output voltage portion substantially dependent only on the light reflected from the foreign bodies.

The dynamically driven reflection light barrier also has a light emitting diode (LED) and pulse generator driving the light emitting diode so that it produces light which varies periodically in its intensity. The dynamic output voltage portion from the receiver varies according to the periodic variations of the light produced by the LED and depends only on the light produced by the LED which is reflected.

Advantageously a voltage raising circuit operative is also provided for raising an operating voltage to a supply voltage for the receiver.

The circuit arrangement according to the invention has the advantage in comparison with the above that the operational reliability of the circuit particularly when there is a high level of extraneous light interference on the sensor is ensured.

A further advantage is to be found in the control of the working point of the receiver, since the DC portion, generated by the extraneous light, of the output voltage is compensated independently of the amplitude of the incident extraneous light. In the case of a high level of extraneous light, a phototransistor connected as receiver would switch, for example, through to saturation without control, as a result of which the useful signal capable of being evaluated would be greatly reduced. By the working point controller means, the useful signal can be evaluated independently of the extraneous light.

It is also advantageous that by the control of the working point the receiver becomes insensitive to high ambient temperatures. High ambient temperatures can reduce the current amplification for example of a phototransistor so that the useful signal which is capable of being evaluated is likewise reduced.

By means of the measures specified in the subclaims, advantageous further developments and improvements of the circuit arrangement disclosed in the main claim are possible.

The voltage raising circuit which increases the working range of the receiver above the limit present due to the vehicle electrical system voltage is also to be considered a particular advantage. As a result, particularly in the case of a high level of extraneous light, a useful signal is obtained from the contamination sensor which is still capable of being evaluated.

In order to detect the influence of extraneous light it is advantageous to detect the average value over time of the output voltage of the phototransistor. Flashes of light or reflections which supply brief voltage pulses do not influence the measurement result since they are filtered out.

In order to suppress the influence of the extraneous light, the output voltage of the receiver is advantageously increased with an increasing portion of extraneous light or the collector resistor resistance is reduced. As a result, the useful signal can be evaluated over the entire working range of the receiver.

The use of a phototransistor as a receiver advantageously provides a simple means for constructing the contamination sensor.

It is also advantageous to use a field-effect transistor instead of a collector resistor since its resistance control can be of particularly simple construction.

Since in headlamps the light yield is greatly reduced with increasing contamination of the lenses, it is advantageous to arrange the reflection light barrier in the region of the lens. A contaminated lens or window can easily be detected by the reflection light barrier from the level of the reflected radiation as an AC voltage signal, i.e. a periodically varying voltage signal, and then used to switch the lens or window wiper and/or a washing device. Further advantages of the invention can be found in the description.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 shows a second exemplary embodiment and
FIG. 4 shows a third exemplary embodiment.

DESCRIPTION OF THE PREFERRED EMBODIMENTS

Figure 1:
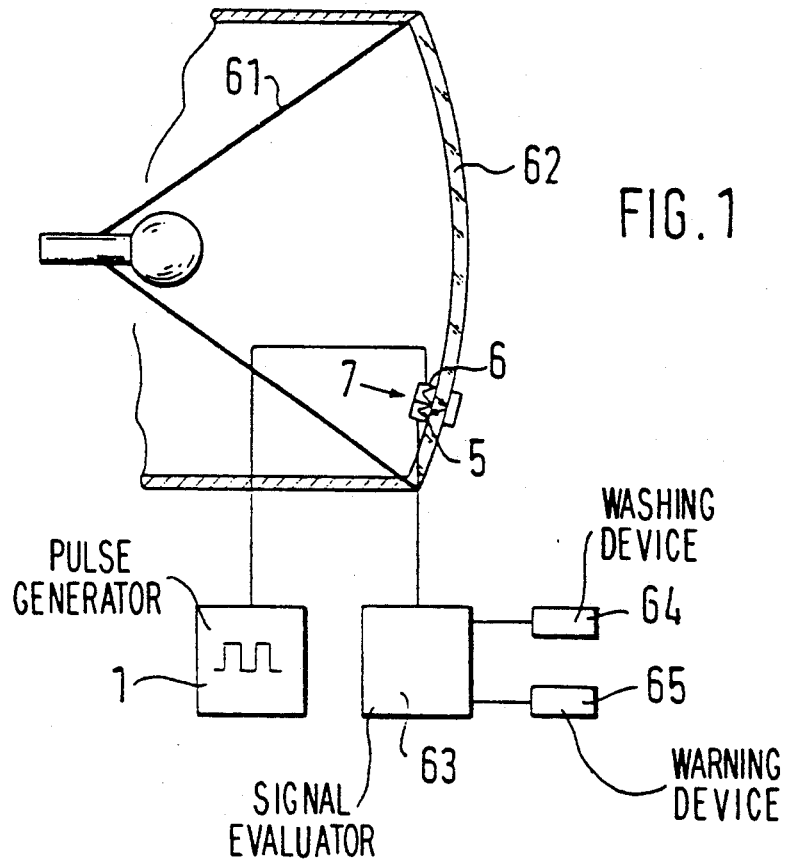
FIG. 1 shows a part of a headlamp glass with a reflection light barrier.

FIG. 1 shows a portion of a headlamp which has a reflector 61 and a lens as a transparent plate 62. A reflection light barrier 7 with a transmitting diode 6 and a phototransistor 5 are arranged on the inside of the lens at a non-interfering point. This reflection light barrier 7 is commercially available, for example as an infrared reflection light barrier. The transmitting diode 6 is connected to a pulse generator 1 which transmits a predetermined pulse sequence as current pulses or voltage pulses. The phototransistor 5 is connected to a signal evaluator 63 which analyses the useful light portion and extraneous light portion. The analysed signals are conducted to one or more signal outputs which are connected for example to a washing device 64 or a warning device 65.

Figure 2:
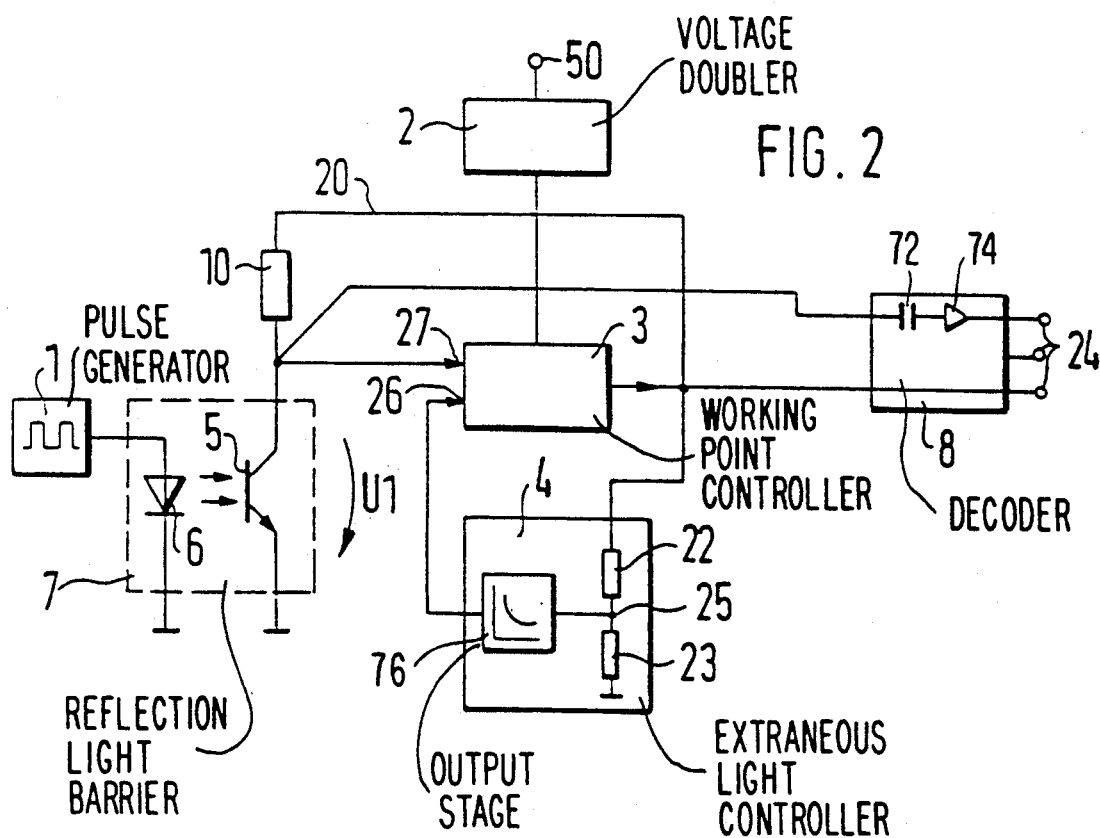
FIG. 2 shows a first exemplary embodiment.

In FIG. 2, the current diagram of a first exemplary embodiment is illustrated in the form of a block circuit diagram. The collector of the phototransistor 5 is connected via a resistor 10 to a voltage supply line 20. A working point controller 3 is connected parallel to this resistor 10. The working point controller is designed as a PI controller which has a low-pass filter connected upstream of it. The output of the working point controller 3 is connected on the one hand to a extraneous light controller 4 and on the other hand to an input of a decoder 8. A further input of the decoder 8 is connected to the collector 21 of the phototransistor 5. The decoder has one or more outputs to which the devices (not illustrated) such as washing device or warning device can be connected. High-pass filters and low-pass filters as well as memory and driver stages for the separate evaluation of the useful light level and extraneous light level are provided in the decoder 8.

The extraneous light controller 4 has a controller which transmits an output signal according to a predetermined characteristic curve, for example a hyperbolic function, by an output stage 76. This signal is formed with respect to the input signal corresponding to the extraneous light. The characteristic curve is expediently determined in an experimental fashion. Of course, any other characteristic curve can also be prescribed. For the purpose of adapting the input, a voltage divider 22/23 is connected upstream of the input, with which divider the DC voltage signal of the working point controller 3 can be set at the center tap-off 25. The voltage divider 22/23 is tuned in such a way that with maximum possible extraneous light the output of the extraneous light controller reaches a still suitable value at the reference value input 26 of the working point controller 3.

The voltage supply for the individual circuits is therefore not illustrated since they are operated by the operating voltage which is usually 12 volts in the motor vehicle. The working point controller 3 is connected to a voltage doubling circuit 2 which raises the operating voltage for supplying the receiver 5 to an approximately doubled value.

In FIG. 3 the block circuit diagram of a further exemplary embodiment is illustrated, in which a constant current source 30 is connected in series with the phototransistor 5. The constant current source is connected to the vehicle electrical system 50 via the voltage doubling circuit 2.

The constant current source 30 exhibits a low-pass filter characteristic so that the current is slowly made to follow the extraneous light signal.

Voltage doubling circuits 2 are known per se and therefore do not have to be described in greater detail.

The collector 21 of the phototransistor 5 is connected to the decoder 8. The decoder 8 has the properties described in FIG. 2.

A third exemplary embodiment is illustrated in FIG. 4. It is distinguished from the first exemplary embodiment in that the resistor 10 is replaced by a field-effect transistor 41 whose drain terminal D is connected to the voltage doubling circuit 2 and whose source terminal S is connected to the collector 21 of the phototransistor 5. The output of the working point controller 3 is connected to the control gate G of the field-effect transistor 41.

The further wiring is identical to the exemplary embodiment illustrated in FIG. 2.

The mode of operation of this circuit arrangement is described below.

The arrangement of the reflection light barrier 7, for example on a lens of a headlamp according to FIG. 1 and the constructional criteria to be taken into account are described in the German Offenlegungsschrift 36 19 208. It has been proven that an arrangement of this kind of a reflection light barrier 7 cannot in all cases distinguish the DC voltage signal generated by the extraneous light from the pulsed useful signal. In particular, when there is a high extraneous light portion, the phototransistor 5 is driven heavily into saturation so that no useful signal can be tapped off at its collector. High temperature loads which are generated by the headlamp also cause the working point of the phototransistor to drift away and, as a result, also cause the extractable useful signal to be too small. Also fluctuations of the operating voltage, in particular at night when a large number of loads are switched on, lead to an undesired low collector-emitter voltage U1.

The phototransistor 5 receives the pulsed radiation transmitted by the transmitting diode 6 and the incident extraneous light. As a result, a collector-emitter voltage U1 which is composed of an AC voltage portion and a DC voltage portion is produced. The level of the DC voltage portion is a measure of the incident extraneous light level while the AC voltage indicates the degree of contamination of the headlamp lens or window.

The collector-emitter voltage U1 is essentially determined by the resistor 10 and the supply voltage 20. Since the DC voltage portion of the collector-emitter voltage U1 would, however, be reduced in the case of a high level of extraneous incident light, it is held approximately at a fixed value by the working point controller 3, which value is 5 volts in this exemplary embodiment. The working point controller 3 forms with the aid of a low-pass filter the average value of the collector potential and compares this value with the reference value predetermined by the extraneous light controller 4. The output of the working point controller 3 then supplies the resistor 10 and the phototransistor 5.

In order to improve the control range of this circuit, the supply voltage 20 must be selected to be as large as possible. However, since it cannot be raised above the operating voltage, which is usually 12 volts, a voltage increasing circuit 2 which doubles the operating voltage 50 in this exemplary embodiment to 24 volts, is connected upstream of the working point controller 3. As a result, the supply voltage 20 can also be raised to approximately 24 volts. This measure ensures that even in the case of a high level of extraneous incident light a still adequate AC voltage portion of the collector-emitter voltage U1 is available for the useful signal. This collector-emitter voltage U1 is compensated within a certain time by the working point controller 3 on the basis of its PI characteristic curve.

The reduction of the degree of contamination or of extraneous light influences would cause, without working point controller 3, the DC voltage portion of the collector-emitter voltage U1 to rise and thus the measured value to be inaccurate. The working point controller 3 prevents the rise. In this case, the predetermined reference value at the input 26 of the working point controller 3 is increased so that with a corresponding characteristic curve of the extraneous light controller 4 the DC voltage portion of the extraneous light and of the useful signal is completely compensated so that an interference-free AC voltage signal is available as useful signal.

The decoder 8 filters the contamination sensor signal out of the collector-emitter voltage U1 by means of a high-pass filter or bandpass filter, e.g. containing the condenser element 72 as shown in FIG. 4, and conducts it to a driver stage, e.g. containing semiconductor elements 74 as shown in FIG. 4, to which a corresponding switch or relay can be connected at the output 24. The decoder 8 also contains corresponding signal stores or level comparators with which the filtered-out signal for the required switches can be stored.

The AC voltage signal can be derived both from a contaminated lens or window and also from a lens or window moistened with raindrops. It has proven the case that with a contaminated lens or window the AC voltage signal is particularly large while with a lens or window moistened by rain it is particularly weak. The explanation of this is that in the case of rain the transmitter signal is neutralized to a particularly high degree and therefore only a small amount of reflected radiation passes into the receiver 5. This signal is fed to a level comparator so that in the case of a weaker signal the window wiper or lens wiper can be switched on and in the case of a stronger signal the spray device can be switched on.

On the other hand, the DC voltage portion of the input signal is neutralized by a low-pass filter. This signal corresponds to the extraneous light portion which can originate either from the oncoming light or from the vehicle's own headlamps.

Since the light portion of the vehicle's own headlamps is always constant, a corresponding DC voltage level, which can also be used for monitoring the headlamp, is set. If this DC voltage portion is absent, the headlamp is either switched off or defective. In this way, a simple monitoring of the serviceability of the lamp is obtained. The driver can be informed as to the serviceability of the lamps by a corresponding display on the dashboard.

In the case of incident extraneous light which arises from an oncoming vehicle, the DC voltage level changes relatively slowly. This slow change is exploited to use this extraneous light portion to drive a further function. This signal is likewise conducted to an output stage and when a specific level is reached, for example the vehicle's own headlamps can be switched over from full beam to dipped headlamps.

For the purpose of detection, this signal is conducted via a differentiator and the amplitude evaluated by means of a comparator.

In the second exemplary embodiment according to FIG. 3, a constant current source 30 which is fed from the voltage doubling circuit 2 is used to supply the phototransistor 5. The constant current source 30 contains a low-pass filter or bandpass filter so that the current averaged over time is constant but the output voltage U1 can follow the variation of the useful signal. This signal is also neutralized for example at the collector of the phototransistor 5, as in the first exemplary embodiment, and conducted to the decoder 8 and evaluated there in the same way as already described.

In order to obtain the advantages of the extraneous light control, the constant current source 30 can be combined with a working point controller and/or with an extraneous light controller.

In the third exemplary embodiment, the resistor 10 is replaced by a field-effect transistor 41. The field-effect transistor acts as a variable resistor which is driven by the working point controller 3 via its gate and is variable as a function of the extraneous light portion. In order to have a sufficient voltage range available, said transistor is fed from the voltage doubling circuit 2.

In a further embodiment of the invention it is provided also to measure the ambient brightness in order to switch on the headlamps automatically when required in poor light conditions. If the ambient brightness reaches a specific minimum value, the headlamps are then automatically switched on with a certain delay. In order to switch off the headlamps, a further switching threshold can be used. It is also provided to monitor the automatic switching of the headlamp by means of a main switch, for example the ignition switch.

It will be understood that each of the elements described above, or two or more together, may also find a useful application in other types of constructions differing from the types described above.

While the invention has been illustrated and described as embodied in a contamination sensor for transparent elements on motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A circuit arrangement for an optoelectronic contamination sensor for detecting foreign bodies on a transparent element, said circuit arrangement comprising a dynamically driven reflection light barrier having a receiver structured and positioned to receive light reflected from foreign bodies on a transparent element; a resistor connected electrically with said receiver; means for supplying a supply voltage across said receiver and said resistor including a voltage raising circuit for raising an operating voltage to the supply voltage; and a working point controller means connected electrically to said receiver for controlling a voltage difference across said receiver as a function of an incident extraneous light intensity to compensate for the extraneous light intensity and to obtain an AC output voltage portion from the receiver dependent on the light reflected from the foreign bodies.

2. A circuit arrangement as defined in claim 1, wherein said receiver has a receiver output and a DC voltage portion is produced at the receiver output as well as the AC output voltage portion during operation of the receiver, and further comprising means for averaging the receiver output voltage including the AC portion and the DC portion over time to determine the DC voltage portion when incident extraneous light is present.

3. A circuit arrangement as defined in claim 1, wherein said receiver has a receiver output voltage and further comprising means for raising the output voltage at said receiver when the extraneous light intensity increases.

4. A circuit arrangement as defined in claim 1, wherein said receiver is a photoresistor.

5. A circuit arrangement as defined in claim 1, wherein the voltage raising circuit operative for raising the supply voltage is structured to approximately double the operating voltage.

6. A circuit arrangement as defined in claim 1, wherein the dynamically driven reflection light barrier includes a light emitting diode located adjacent the receiver, said light emitting diode being connected electrically to a pulse generator to generator light pulses for reflection by the foreign bodies and detection by the receiver.

7. A circuit arrangement for an optoelectronic contamination sensor for detecting foreign bodies on a transparent element, said circuit arrangement comprising a dynamically driven reflection light barrier including a receiver for reflected light; a field-effect transistor connected electrically with said receiver; and means for supplying a supply voltage across said receiver and said field-effect transistor including a voltage raising circuit operative for raising an operating voltage to the supply voltage; and a working voltage controller means connected electrically to said receiver and said field-effect transistor for controlling a voltage difference across said receiver as a function of an incident extraneous light intensity on the receiver to compensate for the extraneous light intensity and to isolate an AC output voltage portion of the receiver substantially dependent only on the reflected light.

8. A motor vehicle, comprising a transparent element; a circuit arrangement for an optoelectronic contamination sensor for detecting foreign bodies on said transparent element, said circuit arrangement having a dynamically driven reflection light barrier having a receiver for reflected light and a resistor connected electrically with said receiver through which a supply voltage is applied to said receiver, a working point controller means for controlling a voltage difference across said receiver as a function of an incident extraneous light intensity on the receiver to compensate for the extraneous light intensity and to isolate a dynamic output voltage portion from the receiver and a voltage raising circuit operative for raising the supply voltage for said receiver; and an output connected to the receiver and for connection to a cleaning member provided for cleaning said transparent element and controllable by the dynamic output voltage portion of said receiver.

9. A motor vehicle as defined in claim 8, wherein said transparent element is a vehicle window.

10. A motor vehicle as defined in claim 8, wherein said transparent element is a vehicle lens.

11. A motor vehicle as defined in claim 8, wherein said cleaning member is a wiper.

12. A motor vehicle as defined in claim 8, wherein said cleaning member is a washing device.

13. A motor vehicle as defined in claim 8, wherein said transparent element is a lens of a motor vehicle headlamp, said reflection light barrier being arranged in the region of said lens of said motor vehicle headlamp.

14. A circuit arrangement for an optoelectronic contamination sensor for detecting foreign bodies on a transparent element, said circuit arrangement comprising a dynamically driven reflection light barrier including a light emitting diode, a pulse generator connected electrically to the light emitting diode to produce light pulses and a phototransistor having a collector and an emitter, said phototransistor and said light emitting diode being positioned on a transparent element so said phototransistor receives light reflected from foreign bodies on the transparent element as well as incident extraneous light; a resistor connected electrically with the collector of said phototransistor; means for applying a supply voltage across the resistor and the phototransistor; and a working point controller means connected electrically to the collector of said photoresistor for controlling a voltage difference across the collector and emitter of the photoresistor as a function of the incident extraneous light intensity to compensate for the incident extraneous light intensity and to obtain an AC output voltage portion from the phototransistor determined by the light reflected from the foreign bodies.

15. A circuit arrangement as defined in claim 14, wherein the transparent element is located in a motor vehicle having means for providing an operating voltage and further comprising a voltage raising circuit operative for increasing the operating voltage to provide the supply voltage for the photoresistor.

16. A circuit arrangement as defined in claim 15, wherein the transparent element is a lens of a motor vehicle head lamp of the motor vehicle.

* * * * *